*US011648735B2*

United States Patent
Lehmann

(10) Patent No.: US 11,648,735 B2
(45) Date of Patent: May 16, 2023

(54) AUTOMATED CALIBRATION OF AN APPARATUS FOR THE FULLY PARALLELIZED ADDITIVE MANUFACTURING OF A COMPONENT WITH COMBINED WORKING AREAS

(71) Applicant: RAYLASE GmbH, Wessling (DE)

(72) Inventor: Wolfgang Lehmann, Germering (DE)

(73) Assignee: RAYLASE GmbH, Wessling (DE)

( * ) Notice: Subject to any disclaimer, the term of this patent is extended or adjusted under 35 U.S.C. 154(b) by 158 days.

(21) Appl. No.: 16/625,127

(22) PCT Filed: Jun. 26, 2018

(86) PCT No.: PCT/EP2018/067008
§ 371 (c)(1),
(2) Date: Dec. 20, 2019

(87) PCT Pub. No.: WO2019/002232
PCT Pub. Date: Jan. 3, 2019

(65) Prior Publication Data
US 2020/0156313 A1 May 21, 2020

(30) Foreign Application Priority Data

Jun. 26, 2017 (DE) ...................... 10 2017 114 147.2
Jan. 10, 2018 (EP) ...................... 18150935

(51) Int. Cl.
*B29C 64/153* (2017.01)
*B29C 64/393* (2017.01)
(Continued)

(52) U.S. Cl.
CPC ............ *B29C 64/393* (2017.08); *B22F 10/31* (2021.01); *B22F 12/41* (2021.01); *B29C 64/153* (2017.08);
(Continued)

(58) Field of Classification Search
CPC ... B29C 64/153; B29C 64/282; B29C 64/245; B29C 64/393; B29C 64/268;
(Continued)

(56) References Cited

U.S. PATENT DOCUMENTS 6,292,584 B1 9/2001 Dulaney et al.
6,683,976 B2 1/2004 Dulaney et al.
(Continued)

FOREIGN PATENT DOCUMENTS

CN 101802997 A 8/2010
JP H11309593 A 11/1999
(Continued)

OTHER PUBLICATIONS

International Preliminary Report on Patentability dated Dec. 31, 2019 for International Application No. PCT/EP2018/067008.
(Continued)

*Primary Examiner* — Matthew J Daniels
*Assistant Examiner* — Gregory C. Grosso
(74) *Attorney, Agent, or Firm* — Eschweiler & Potashnik, LLC

(57) ABSTRACT

Arrangement (10) for the powder-bed-based additive manufacturing of a component (100), wherein the arrangement (10) comprises the following: a housing (12), which comprises a building volume (14), wherein the building volume (14) comprises a building area (16); at least three marker devices (20), which are fastened in or on the housing (12), wherein each marker device (20) is suitable for projecting a light reference marking (22) onto a component (100) lying on the building area (16) and/or onto the building area (16); a laser device (30) for the laser processing of a powder bed for generating a component (100) on the building area (16) by means of additive manufacturing, wherein the laser device (30) is set up for the laser processing of an associated
(Continued)

working area (32a-32d), wherein the laser device (30) comprises a detection device (34), which is set up to sense the light reference markings (22); and a control unit (40), which is set up to calibrate the laser device (30) on the basis of the light reference markings (22) sensed by the detection device (34).

19 Claims, 6 Drawing Sheets

(51) Int. Cl.
*B29C 64/282* (2017.01)
*B29C 64/245* (2017.01)
*B29C 64/268* (2017.01)
*B29C 64/25* (2017.01)
*B22F 12/41* (2021.01)
*B22F 10/31* (2021.01)
*B33Y 10/00* (2015.01)
*B33Y 30/00* (2015.01)
*B33Y 40/00* (2020.01)
*B33Y 50/02* (2015.01)
*B22F 10/28* (2021.01)
*B22F 12/00* (2021.01)
*B22F 12/90* (2021.01)

(52) U.S. Cl.
CPC ............ *B29C 64/245* (2017.08); *B29C 64/25* (2017.08); *B29C 64/268* (2017.08); *B29C 64/282* (2017.08); *B22F 10/28* (2021.01); *B22F 12/38* (2021.01); *B22F 12/90* (2021.01); *B33Y 10/00* (2014.12); *B33Y 30/00* (2014.12); *B33Y 40/00* (2014.12); *B33Y 50/02* (2014.12)

(58) Field of Classification Search
CPC ......... B29C 64/25; B33Y 10/00; B33Y 30/00; B33Y 40/00; B33Y 50/02
USPC ........................................................ 264/497
See application file for complete search history.

(56) References Cited

U.S. PATENT DOCUMENTS

| | | |
|---|---|---|
| 2001/0052257 A1 | 12/2001 | Magerle |
| 2002/0021831 A1 | 2/2002 | Dulaney et al. |
| 2003/0192868 A1 | 10/2003 | Dietrich et al. |
| 2007/0240325 A1 | 10/2007 | Pelsue et al. |
| 2010/0125356 A1 | 5/2010 | Shkolnik et al. |
| 2016/0236279 A1* | 8/2016 | Ashton .................. B22F 10/00 |
| 2018/0085998 A1* | 3/2018 | von Burg ............. B29C 64/295 |
| 2018/0326485 A1 | 11/2018 | Brown |

FOREIGN PATENT DOCUMENTS

| | | |
|---|---|---|
| JP | 2013038280 A | 2/2013 |
| JP | 2015160235 A | 9/2015 |
| WO | 2009035259 A2 | 3/2009 |
| WO | WO-2017085470 A1 * | 5/2017 ............. B23K 26/14 |

OTHER PUBLICATIONS

International Search Report dated Sep. 5, 2018 for International Application No. PCT/EP2018/067008.

* cited by examiner

AUTOMATED CALIBRATION OF AN APPARATUS FOR THE FULLY PARALLELIZED ADDITIVE MANUFACTURING OF A COMPONENT WITH COMBINED WORKING AREAS

This Application is a National Phase Entry of PCT/EP2018/067008, filed on Jun. 26, 2018, which claims priority to European Application number 18150935.7, filed on Jan. 10, 2018 & German Application number 10 2017 114 147.2, filed on Jun. 26, 2017. The contents of the above-referenced Patent Applications are hereby incorporated by reference in their entirety.

FIELD OF THE INVENTION

The present invention relates to a system and a method for powder-bed based additive manufacturing of a workpiece, and in particular the calibration and synchronization of multiple laser devices for the parallel production of the workpiece with combined working areas.

PRIOR ART

Additive manufacturing methods, in which to produce a workpiece a material is added in layers and thermally processed, are becoming increasingly important in industrial production in comparison to classical subtractive manufacturing processes, such as milling, drilling and turning, where material is removed in order to produce a workpiece. The layer-based construction, which is characteristic of additive manufacturing process, enables the production of highly complex geometrical structures with a high degree of design freedom, which subtractive methods cannot achieve.

The increase in the industrial importance of additive manufacturing methods is driven by the increasing efficiency of the laser sources that are used for the thermal processing of materials. Accordingly, the market is currently experiencing a transition from an original use of additive manufacturing processes solely for the production of prototypes ("Rapid Prototyping") to a mass industrial application of this technology for series production ("Rapid Manufacturing"). This development is reflected in many sectors of the economy, such as the aerospace industry, the automotive industry, medical technology and prosthetics.

A particular type of additive manufacturing is that of powder bed-based processes, in which a powdered raw material is deposited layer by layer on the workpiece to be manufactured and melted by means of laser light. The powder layers typically have thicknesses in the micrometre range.

A major role in increasing the efficiency of systems for powder bed-based additive manufacturing of components involves the possibility for the parallel processing of a workpiece by means of multiple laser devices, which allows higher throughput rates to be achieved. The combined use of multiple laser devices for the simultaneous production of a workpiece necessarily requires an accurate calibration of the individual laser devices and synchronization of the laser devices with each other. However, this is fraught with difficulties, for which there is as yet no solution. Common calibration systems for systems for additive manufacturing of a workpiece are based on the adjustment of individual galvanometer scanners (so-called galvo-motors) of the laser devices and cannot collectively take account of temperature-related inaccuracies in the entire system.

In the additive manufacturing of workpieces, therefore, there is scope for improvement with regard to the calibration and synchronization of multiple laser devices operating in parallel.

DESCRIPTION OF THE INVENTION

The purpose of the present invention is to allow the calibration, recalibration and synchronization of one or more laser devices operating in parallel for powder bed-based additive manufacturing a workpiece. The term "parallel" as used herein means, in particular, a fully parallelized manufacturing process, in which a plurality of laser devices involved in the manufacturing implement the production of the workpiece by simultaneously processing a common construction area by interaction.

The present invention relates to a system for powder bed-based additive manufacturing a workpiece. The system comprises a housing that comprises a construction volume, wherein the construction volume includes a construction area. The construction area is a 2-dimensional cross-sectional plane of the construction volume and covers a surface of the housing on which the workpiece can be generated layer by layer by successive powder-bed coatings and subsequent thermal processing. The construction area is typically a vertical projection of the 3-dimensional construction volume. This means, for example, that in the case of a cylindrical construction volume, the construction area can correspond to a circular cross-sectional plane, and for a cube-shaped construction volume the construction area may correspond to a square cross-sectional plane, wherein arbitrary shapes of the construction volume are possible. The construction volume can correspond, for example, to a separate volume subsection of the interior of the housing, and the construction area can cover a corresponding area segment of a lower surface of the housing, which represents a 2-dimensional projection of the construction volume onto the lower surface of the housing. The construction area can also cover a movable surface, on which a topmost layer powder bed of the raw material rests. The movable surface in this case can be shifted after the laser processing of each powder bed layer along a direction such that a distance between the construction area or the topmost powder bed layer of the raw material to be processed and the laser devices remains constant.

It should be noted, however, that both the construction volume and the construction area can be virtual geometric constructs, which can cover a specific spatial area of the system but need not have a physical nature. Although the construction area can extend, for example, over a separate area section of the housing of the system, it needs not necessarily be identified with this separate area section. The same applies to the construction volume.

The construction volume can be isolated from an environment by the housing, whereby disturbing interactions of the environment with the construction volume can be avoided in order to preserve the physical conditions required for the additive manufacturing of the workpiece in the construction volume, such as pressure, temperature, humidity, purity of the atmosphere, etc. However, the housing can allow an optical interaction with the construction volume from outside the housing, for example by means of a transparent section of the housing. A transparent section of the housing can spatially match the construction volume or the construction area, to enable the visual observation and optical monitoring of the manufacturing process in the construction volume and an optical action on the construction volume from outside the housing.

The system further comprises at least two, preferably at least three marking devices which are fixed within or onto the housing, wherein each marking device is suitable for projecting a light reference mark onto a workpiece located on the construction area and/or onto the construction area. The marking devices are preferably fixed to the housing in such a way that the marking devices can follow thermodynamically-induced deformations of at least a portion of the housing. The marking devices can be located inside or outside the housing. If they are arranged outside the housing, however, the marking devices are arranged in such a way that they can make optical contact with the construction area and the workpiece, for example by means of a transparent portion of the housing.

By fixing the marking devices in or on the housing it can be ensured that uncontrolled thermo-mechanical deformations of the housing or strains of a portion thereof act equally on the construction volume and on the position of the light reference marks. Such deformations and strains can occur in the course of the manufacturing process, for example due to temperature variations in the construction volume. In this way, it is possible to avoid or mitigate the problem whereby the placement of the light reference marks on the construction area or on the workpiece is affected by the aforementioned effects in an uncontrolled manner. Instead, in the event of strains or deformations of the housing the marking devices move along at least partly with the housing, so that the relative positions of the light reference marks projected by the marking devices in relation to the construction volume and/or the construction area can be maintained.

The marking devices have a very high pointing stability, so that in addition to the aforementioned desired "drifting along" with the housing as a result of thermodynamically-induced deformations or strains, no further drift acts on the marking devices.

It should be understood that, when no workpiece is contained or being produced in the construction volume, the light reference marks are projected directly onto the construction area. If a workpiece is placed on the construction area, be it a finished workpiece or a workpiece that is currently being produced, the light reference marks can be projected both onto the workpiece, i.e. on a topmost—possibly yet to be processed—powder layer of the workpiece, as well as on regions of the construction area that are not covered by the workpiece. In addition, this has the advantage that the position of the light reference marks is independent of the stage of development of the workpiece during the manufacture, since the light reference marks can always be projected onto a top-most layer of powder of the workpiece.

The system further comprises a laser device for laser processing a powder bed to generate a workpiece on the construction area by means of additive manufacturing. The laser device is configured for laser processing a corresponding working area.

The laser device can be arranged over the housing and can be configured for interacting optically through a transparent part of the enclosure with the construction volume or the construction area and/or with a workpiece located in the construction volume. This optical interaction can be used both for laser processing of a powder material for the purpose of additive manufacturing the workpiece and for the calibration of the system.

Herein the term "laser device" is understood to refer to a device which is suitable for laser processing the powder used for manufacturing of the workpiece as part of the additive manufacturing process. In particular, a laser device can comprise a deflection unit, also called a deflection head, which allows scanning the entire construction volume, and which can control the precise laser-controlled fusion of the powder used to produce the workpiece. For the system described herein, the deflection units which are the object of patent application DE 10 2016 120 523 are particularly suitable as part of the laser devices, wherein the disclosure is not limited thereto, since the use of other laser devices or other deflection units is also possible.

The laser device further comprises a detection device that is configured for detecting the light reference marks. The detection of the light reference marks by the detection device can be carried out by optical detection of the light reference marks reflected by the construction area or by the workpiece. This detection can involve a mechanically controlled adjustment of the components of the laser device, such as mirrors, lenses, galvanometers, deflection units, or other optical and/or electronic elements. The light reference marks can be completely detected. Alternatively, the light reference marks can however also be partially detected, such that only selected regions or portions of one or more of the light reference marks are d. Both variants are covered by the expression "detecting the light reference marks".

The detection of light reference marks by the detection device and a subsequent adjustment of the laser device to the light reference marks can be controlled by means of a suitable software. The internal structure and operating principle of a laser device, including the aforementioned software, are known from the prior art and will not be described in detail herein. For further details reference is instead made to the above-mentioned patent application DE 10 2016 120 523.

The system further comprises a control unit that is configured for calibrating the laser device based on the light reference marks detected by the detection device. To this end, the control unit can comprise a processor on which an appropriately designed software can be executed, and a memory in which the software is stored. Based on this calibration, which is based on the light reference marks produced by the marking devices, the system according to the invention allows a precise operation of the laser device for producing the workpiece as part of the additive manufacturing process.

Temperature fluctuations of the laser devices occurring during operation can adversely affect the accuracy of the laser devices in the form of an offset drift and/or a gain drift. These can cause a point specified by a laser device or the processor of a laser device in relation to the construction volume to "wander" or vary, so that the point of the construction volume which is to actually struck by the laser device when a specific point is aimed at, varies over time. By means of the calibration, the laser device is adjusted to actually strike a desired targeted point of the construction volume for the purpose of the laser processing. In particular, the calibration can compensate for or correct the effects of an offset drift and/or a gain drift.

The system according to the invention allows calibrating the laser device, wherein negative effects of operationally induced sources of error on the accuracy of the system can be taken into account. This allows an increased positional accuracy of the laser processing of the workpiece by the laser device in the system, which is ultimately reflected in an increased quality of the manufactured workpiece.

According to a preferred embodiment, at least three of the marking devices are suitable for projecting a line-shaped light reference mark, wherein the line-shaped light reference marks intersect pairwise at at least three associated intersection points. The detection device is configured for detecting the at least three intersection points and the control unit is further configured for calibrating the laser device based on the at least three intersection points detected by the detection device. The use of intersection points for calibration, at which line-shaped light reference marks cross, allows a better drift behaviour and a better image sharpness.

In a preferred embodiment, the system comprises a plurality of laser devices. Each laser device is configured for laser processing a corresponding working area. The working areas of the respective laser devices cover a common overlap area. This common overlap area can correspond to the construction area, which means it can be congruent with the construction area. This may be the case, for example, if the working areas of the individual laser devices cover a common square overlap area and the construction area is a square construction area. The common overlap area may however comprise the construction area without being congruent with the same. This may be the case, for example, if the working areas of the individual laser devices cover a common square overlap area, but the construction area is a square construction area.

Each of the laser devices can cover or process a separate working area, which at least partially overlaps with the working areas of the remaining laser devices. The plurality of laser devices are configured for simultaneously parallel laser processing this common overlap area, which corresponds to the construction area or comprises the construction area. The laser device can be arranged over the housing and configured for interacting optically through a transparent part of the housing with the construction volume or the construction area and/or with a workpiece located in the construction volume. This optical interaction can be used both for laser processing a powder material for the purpose of additive manufacturing of the workpiece and for the calibration and synchronization of the system.

The control unit is further configured for calibrating the plurality of laser devices and/or for synchronizing different laser devices with each other based on the light reference marks and/or on the intersection points detected by the detection devices. Based on this synchronization, which is based on the light reference marks and/or intersection points produced by the marking devices, the system according to the invention allows a precise and simultaneous parallel operation of the plurality of laser devices for the parallel production of the workpiece as part of the additive manufacturing process. Thereby, an improved synchronization of the laser devices with each other is achieved.

In a preferred embodiment the system further comprises a cover element which is designed to cover the housing, wherein the at least two marking devices are preferably fixed within or onto the cover element. "Covering" in this context can refer to the production of a fluid-tight connection between the cover element and the housing, with which the interfering mechanical or chemical interactions of the environment with the volume can be avoided to ensure the preservation of the required physical or chemical conditions in the construction volume for the additive manufacturing of the workpiece. Nevertheless, the cover element allows for an optical interaction with the construction volume from outside of the housing. In particular, the cover element can be totally or partially transparent to enable the visual observation and visual monitoring of the manufacturing process as well as an optical effect on the construction volume from outside the housing. The cover element can comprise, for example, a glass window, which is spatially matched to the construction area and hence covers the entire construction volume.

According to a preferred embodiment, the at least two marking devices are arranged outside of the housing. The marking devices are then separated by the housing or by the cover element from the interior of the housing, or the construction volume. This allows the operation of the marking devices to be stabilized. At the same time, the marking devices, which at the same time are fixed to the cover element, follow temperature-induced deformations of the cover element, which in accordance with as expected are similar to the deformations that are produced in the construction volume.

In a preferred embodiment the plurality of laser devices comprises at least four laser devices, which are suitable for processing the entire construction area in parallel for manufacturing the workpiece. The number of markers devices can therefore also be at least four, wherein the number of marking devices must not necessarily match the number of the laser devices. The number of marking devices is two or more, preferably three or more. It is important to note that other configurations with any first number of laser devices and any second number of marking devices are also possible.

According to a preferred embodiment the construction area has one or more reference marks, and the detection device of at least one of the laser devices is further configured for detecting the one or more reference marks. The reference marks can be mark of any kind, for example, etched or chromatized structures, but also optically generated marks. The reference marks can be, for example, marks formed on a surface of the housing matching the construction area by etching, chromatization, or the like.

The detection of the reference marks by the detection device of at least one of the laser devices can be carried out by the same mechanism which is used for the detection of the light reference marks as stated above. In particular, the same components of the detection device can be used for the detection of the reference marks as for the detection of the light reference marks.

The reference marks allow adjusting the marking devices to the construction area. For example, the marking devices can be adjusted in such a way that the corresponding light reference mark takes a predetermined spatial relationship with respect to one or more of the reference marks.

In particular, the marking devices can be adjusted such that one or more of the light reference marks is brought into overlap with one or more of the reference marks. This adjustment can take place, for example, as part of a basic adjustment before the production of the workpiece. Thus, the marking devices are adjusted to the construction area using the reference devices before applying the first layer of powder. After application of the successive layers of powder to the workpiece in the construction volume, the precise positioning of the reference marks, and consequently the construction area, remains visible due to the projected light reference marks. The basic adjustment just described can be repeated at later times to re-adjust the system.

In addition, the laser devices can be adjusted to the construction area based on the reference marks, allowing the laser devices to detect the exact positioning and the extent of the construction area and, where appropriate, adjust the setting of its optical, mechanical and electromagnetic components accordingly. The adjustment of the laser devices to the construction area can comprise, for example, settings relating to a focus, a beam angle or a beam intensity.

In a preferred embodiment, the system further comprises a removable reference marking plate, which can be arranged in or on the construction area and comprises the one or more reference marks. The reference marking plate can be suitable for being mounted in the interior of the housing, for example, onto a bottom surface of the housing. The reference marking plate is preferably congruent with the construction area. In the case of a circular construction area, the reference marking plate can be a disc-shaped plate, for example. The reference marks can be marks of any kind, for example, structures etched or chromatized on the reference marking plate, but also optically generated marks.

According to a preferred embodiment, at least one marking device comprises a laser light source. In some embodiments, at least three of the marking devices can comprise a laser light source, which is further configured for generating a corresponding light reference mark as a point-shaped or cross-shaped light reference mark.

Alternatively or in addition, at least three of the marking devices can comprise a laser light source, which is configured for generating a corresponding light reference mark as a laser line, wherein the at least three laser lines intersect pairwise at a total of at least three corresponding intersection points. For example, three marking devices can create three laser lines which intersect pairwise at three corresponding intersection points and project a laser marker triangle onto a workpiece located on the construction area and/or onto the construction area. Each vertex of the laser marker triangle corresponds to an intersection of two of the laser lines. In a similar way, four marking devices can generate, for example, four laser lines, which intersect pairwise at four corresponding intersection points and form a laser marking quadrilateral, wherein each vertex of the laser marking quadrilateral corresponds to an intersection point of two of the laser lines. The four laser lines projected by the marking devices can in particular be positioned pairwise perpendicular or parallel to each other, such that the projected laser marking quadrilateral is a rectangle or a square. The detection device and the control unit can then be configured in such a way that the intersection points of the light reference marks can form the basis for the calibration and/or synchronization.

Alternatively or in addition, at least one marking device is configured for generating light for generating the light reference mark, which has one or more wavelengths between 405 nm and 850 nm, preferably between 490 nm and 640 nm and particularly preferably between 490 nm and 540 nm.

In accordance with a further preferred embodiment, one or more of the marking devices are configured for projecting the corresponding light reference mark onto an outer perimeter of the construction area, or at a distance from the outer perimeter which does not exceed 10% of the dimension of the construction area. This proves to be particularly advantageous if the construction area has the shape of a rectangle, since the light reference marks can then not only determine the positioning of the construction area, but further its exact dimensions and outer edges. In the case of a circular construction area, the light reference marks are preferably located within the construction area.

In a preferred embodiment, at least one of the laser devices comprises a laser light source, which is configured for generating laser light for laser processing of a workpiece, as well as a deflection unit which is configured for deflecting and scanning light. Said at least one of the laser devices further comprises a wavelength-selective optical element, which is arranged between the deflection unit and the laser light source and is at least partially reflecting for one or more wavelengths of the laser light and at least partially transparent for one or more wavelengths of the light reference marks. A reverse configuration is also possible, in which the wavelength-selective optical element is at least partially transparent for one or more wavelengths of the laser light and at least partially reflective for one or more wavelengths of the light reference marks, depending on the position of the laser light source and the detection device. The wavelength-selective optical element is further configured for decoupling the light of the light reference marks and direct it to the detection device.

The deflection unit can comprise, for example, a first scanning mirror and a second scanning mirror, wherein the first scanning mirror is configured for deflecting and scanning light in a first direction, and the second scanning mirror is configured for deflecting and scanning light in a second direction, wherein the first direction is oriented perpendicular to the second direction. The detection device of the laser device is then arranged on a light path which is followed by light entering the laser device, after the first scanning mirror, the second scanning mirror, i.e. after the deflection unit, and the optical element. It is important to note that this part of the light path can at least partially correspond to the light path taken by the light used for the laser processing—but in the opposite direction.

In some embodiments of the deflection unit, light which enters the laser device is deflected in the direction of the optical element. The light striking the wavelength-selective optical element is completely or partly transmitted or reflected by the wavelength-selective optical element in the direction of the detection device for sensing. Light generated by the laser light source for laser processing the workpiece, on the other hand, is reflected by the wavelength-selective optical element and focused onto the construction volume, such at at this point the light path for the laser light and the light path for the detection of the light reference marks and/or the light reference marks separate.

Of course, it is also possible to use a wavelength-selective optical element that transmits the laser light and reflects the light to be detected by the detection device. In addition, the wavelength-selective optical element can deflect a portion of the light striking the optical element in a direction other than the direction of the detection device, so that this portion of the light can be detected in the laser device for other purposes. The detection device may include, for example, a monochromatic camera with a lens which is specially configured for recording the light reference marks and/or the reference marks. The detection device may also comprise an auto-focusing lens, to enable a sharper detection of the light reference marks and/or the reference marks by the camera.

The present invention also relates to a method for calibrating and/or synchronizing the laser device or the plurality of laser devices of a system for powder bed-based additive manufacturing a workpiece in accordance with any of the previously described embodiments. The method comprises the detection of at least two, preferably at least three, light reference marks with the laser device or with each of the laser devices. The method further comprises calibrating the laser device and/or each of the laser devices and/or synchronizing the plurality of laser devices with each other based on the detected light reference marks. The method can therefore comprise the calibration of at least one laser device, the synchronization of a plurality of laser devices with each other or both, wherein the calibration or synchronization is based on the detected light reference marks.

According to a preferred embodiment, at least three of the light reference marks are line-shaped, wherein the line-shaped light reference marks intersect pairwise at at least three associated intersection points. The detection of light reference marks in such embodiments comprises the detection of the at least three intersection points. The detection of the light reference marks in such embodiments can however also consist in detecting the at least three intersection points. The calibration of the laser device or of each of the laser devices and/or the synchronization of the plurality of laser devices with each other is based on the at least three detected intersection points.

In a preferred embodiment, at least one of the laser devices comprises a deflection unit, wherein a laser beam generated by the associated laser device can be deflected with the deflection unit to scan the construction volume, and the calibration comprises the correction of an offset and/or the compensation of a gain drift of the deflection unit. A person skilled in the art understands by the term "offset of the deflection unit" a constant difference between the actual deflection angle and an intended deflection angle of one or more deflection units, wherein the deflection angle of a deflection unit defines its beam direction. The offset arises as a result of a deviation of the reference zero point of the galvanometers with respect to the actual centre of the deflection angle range of a deflection unit. The term "gain drift" relates to a deviation between an intended variation of the deflection angle and the actually induced variation of the deflection angle. This deviation can also be understood as a variation in the size of the construction area by an enlargement or reduction of the deflection angle range of one or more deflection units.

According to a preferred embodiment, the method further comprises a step in which any one of the marking devices is aligned in such a way that the associated light reference mark takes a predetermined spatial relationship with respect to one or more of the reference marks, in particular being brought into overlap with one of the reference marks.

In a preferred embodiment, the calibration of at least one of the laser devices is based on a selection among the light reference marks and/or the intersection points, wherein light reference marks and/or intersection points that are further away from a centre of the working area of the associated laser device are preferred. Accordingly, the calibration is preferably based on light reference marks or intersection points that have a greater distance from the centre of the working area of the associated laser device than a light reference mark or intersection point located nearest this centre.

In another preferred embodiment, the calibration of the individual laser devices and/or the synchronization of the plurality of laser devices is repeated in the course of the additive manufacturing process. The repetition preferably takes place at regular intervals. Therefore, a continuous adjustment of the laser devices can be performed, which takes account of varying conditions in the course of the operation of the system for producing the workpiece. The repetitions of the calibration or synchronization can take place after each deposition of a new layer of powder on the workpiece. This allows a continuous adaptation or optimization of working settings of the laser devices to the current distance between the workpiece and the respective laser devices.

A further aspect of the present invention relates to a computer program product comprising commands which, when the program is executed by a processor associated with a system according to any of the embodiments described herein, cause said processor to carry out the method according to any of the above embodiments.

A further aspect of the present invention relates to a computer-readable storage medium storing such a computer program product.

DESCRIPTION OF PREFERRED EMBODIMENTS

Additional advantages and features of the invention are inferable from the following description, in which the invention is described based on different exemplary embodiments and with reference to the attached drawings.

Figure 1:
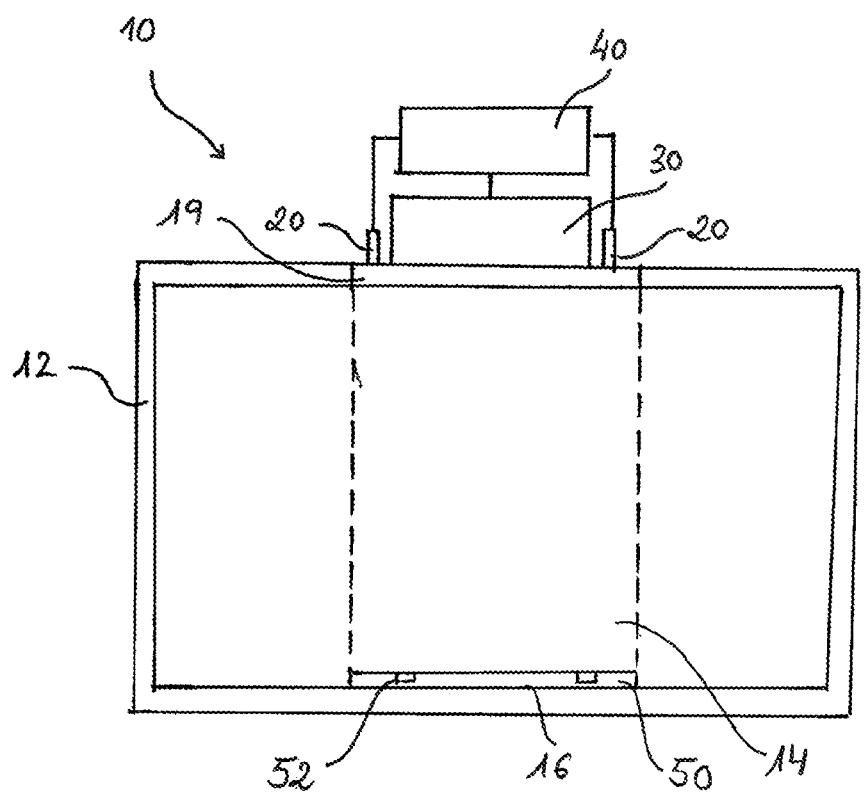
FIG. 1 shows a system for powder bed-based additive manufacturing of a [workpiece] in accordance with one embodiment of the invention.

FIG. 1 shows a system 10 for powder bed-based additive manufacturing a workpiece (see FIG. 2) in accordance with one embodiment of the invention. The system 10 comprises a housing 12, a construction volume 14, a construction area 16, four marking devices 20, four laser devices 30, a control unit 40 and a removable reference marking plate 50.

The construction area 16 is a 2-dimensional cross-sectional plane of the construction volume 14, which covers a section of an inner bottom surface of the housing 12. As shown in FIG. 1, the construction area 16 corresponds to a vertical projection of the construction volume 14 onto the above-mentioned bottom surface of the housing 12. The construction volume 14 corresponds to a volume subsection of the interior of the housing 12, which is marked in the figure with dashed lines.

The four marking devices 20 are fixed to the housing 12, so that they can follow thermodynamically-induced deformations of the housing 12. Each of the marking devices 20 is suitable for projecting a light reference mark onto the construction area 16 or onto a workpiece placed on the construction area 16. The marking devices 20 are arranged on a top side of the housing 12 outside of the housing.

The four laser devices 30 are arranged over the housing 12 and are suitable for processing the entire construction area 16 in parallel to manufacture a workpiece by means of additive manufacturing. The housing 12 has a transparent section 19, which is spatially matched with the construction volume 14 and is located over the construction area 16. Both the laser devices 30 and the marking devices 20 are in optical contact with the construction volume 14 or the construction area 16 through the transparent section 19 of the housing 12.

The reference mark plate 50 in the embodiment shown is a glass plate which rests on the inner bottom surface of the housing 12 and is congruent with the construction area 16. The reference mark plate 50 has four reference marks 52, which are etched on an upper surface of the reference mark plate 50. The reference marks 52 are located on the construction area 16 and can be regarded as reference marks of the construction area 16.

The control unit 40 is functionally connected to the laser devices 30 and the marking devices 20 and is configured for calibrating the laser devices 30 and to synchronize them with each other.

Figure 2:
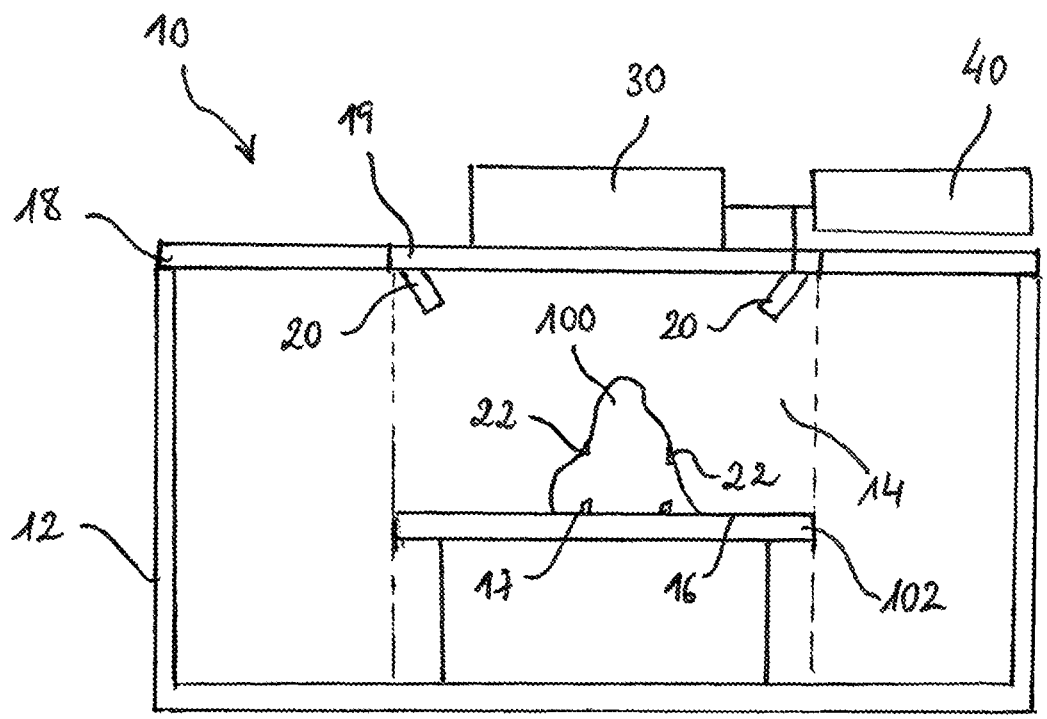
FIG. 2 shows a system in accordance with another embodiment of the invention.

FIG. 2 shows a system 10 for powder bed-based additive manufacturing of a workpiece 100 in accordance with another embodiment of the invention. Elements of the system 10 which are also present in the embodiment shown in FIG. 1, are indicated with the same reference symbols as in FIG. 1. The items which in this embodiment fulfil the same function as in the embodiment already described in relation to FIG. 1, are not explained again. In the embodiment shown the workpiece 100 is formed on a mobile support element 102 which is displaceable along a vertical direction, which after each application of a powder material layer can move downwards, so that the distance between the top layer of the powder material and the laser devices remains constant.

The system 10 of FIG. 2 further differs from that of FIG. 1 in that it comprises a cover element 18, which covers the housing 12 and forms an upper side or upper outer wall of the housing 12. The cover element 18 has a transparent section 19 which corresponds to the transparent section 19 of the housing of FIG. 1. The laser devices 30 are in optical contact with the construction volume 16 and/or the workpiece 100 through the transparent section 19 of the cover element 18.

Furthermore, the marking devices 20 in this embodiment are fixed to the cover element 18 within the housing 12. The figure also shows a workpiece 100 which is produced in the construction volume 14. Each of the marking devices 20 projects a light reference mark 22 onto the workpiece 100. In the embodiment shown the marking devices 20 are configured for generating light for generating the light reference marks 22, which has light wavelengths in the range between 490 nm and 540 nm. The construction area 16 has reference marks 17, which are chromatized on a bottom surface of the housing 12 and in the situation shown are covered by the workpiece 100.

Figure 3:
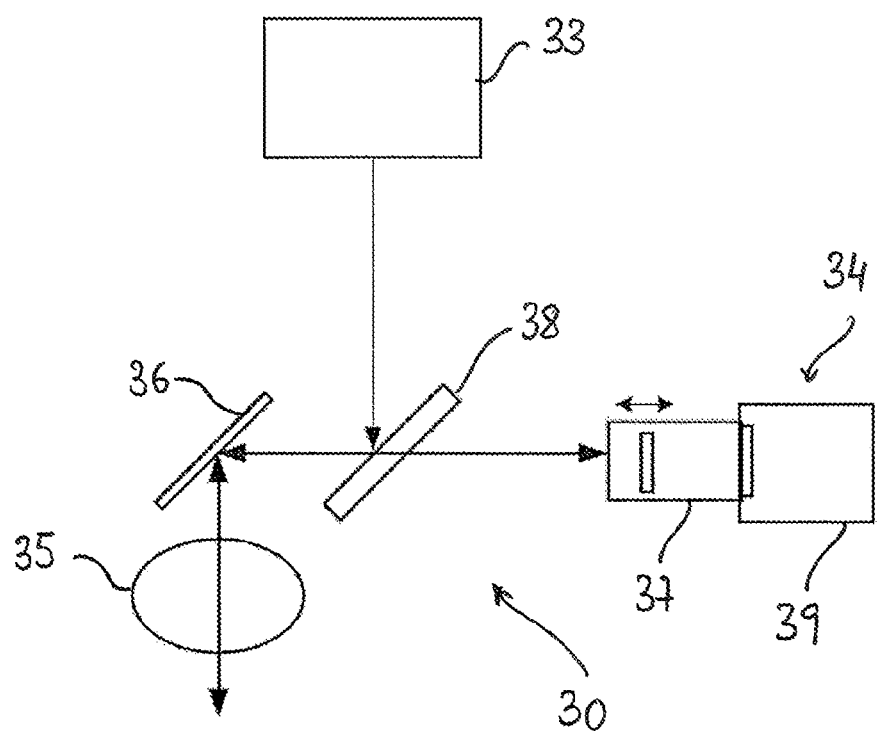
FIG. 3 shows a schematic structure of the components of a laser device of a system in accordance with one embodiment of the invention.

FIG. 3 shows a schematic representation of some of the components of one of the laser devices 30 of a system in accordance with one embodiment of the invention. The laser device 30 comprises a deflection unit with a first scanning mirror 35 and a second scanning mirror 36, and a wavelength-selective optical element 38 and a detection device 34. The laser device 30 further comprises a laser light source 33 for generating the laser light used for laser processing of the workpiece. The wavelength-selective optical element 38 is arranged on the light path that is followed by the laser light generated by the laser light source 33 and/or by the light to be detected by the detection device 34, between the deflection unit, i.e. the scanning mirrors 35 and 36, and the laser light source 33.

Light, in particular, light that is reflected from the construction area 16 of a system or a workpiece 100 being produced in a system, can enter the laser device 30. The deflection unit is configured for deflecting and scanning light. For this purpose, the first scanning mirror 35 is configured for deflecting and scanning light in a first direction, and the second scanning mirror 36 is configured for deflecting and scanning light in a second direction, the first direction and the second direction being oriented perpendicular to one another. The scanning mirrors 35 and 36 of the deflection unit are configured for reflecting light entering the laser device 30 in the direction of the detection device 34 by means of the optical element 38. The wavelength-selective optical element 38 is configured for being transparent for a wavelength range of the light of the light reference marks 22 reflected by the scanning mirrors 35 and 36, which enters the laser device 30 from the direction of the construction volume, so that this light is transmitted in the direction of the detection device 34 and detected by the same. This wavelength range of the light directed onto the detection device 34 is optimized to the detection settings of the detection device 34. As shown in FIG. 3, the detection device 34 is arranged along the light path followed by the light entering the laser device 30, after the first scanning mirror 35, the second scanning mirror 36 and the optical element 38.

The wavelength-selective optical element 38 is also reflecting for laser light generated by the laser light source 30 of the laser device 33 for laser processing of a workpiece, so that the laser light generated by the laser light source 33 is reflected from the first scanning mirror 35 and the second scanning mirror 36 in the direction of the construction volume.

The positioning and/or angle settings of the first scanning mirror 35 and the second scanning mirror 36 can be set, for example, by means of corresponding galvanometers, to deflect the laser beam in the direction of a target point of the construction volume and in order to deflect the light of the light reference marks 22, which enters the laser device, through the wavelength-selective optical element 38 in the direction of the detection device.

The laser light is indicated in the figure by an arrow pointing downwards from the laser light source 33. As shown in the figure, the light path of the laser light and the light path of the light that is detected by the detection device 34 overlap to the left of the optical element 38. The detection device 34 in the embodiment shown comprises a camera 39 and a lens 37, which is specially configured for the detection of the light reference marks and the reference marks and can comprise an auto-focusing lens, which can be configured for focusing the light detection by the detection device 34. The camera 39 can be a monochromatic camera.

Figure 4:
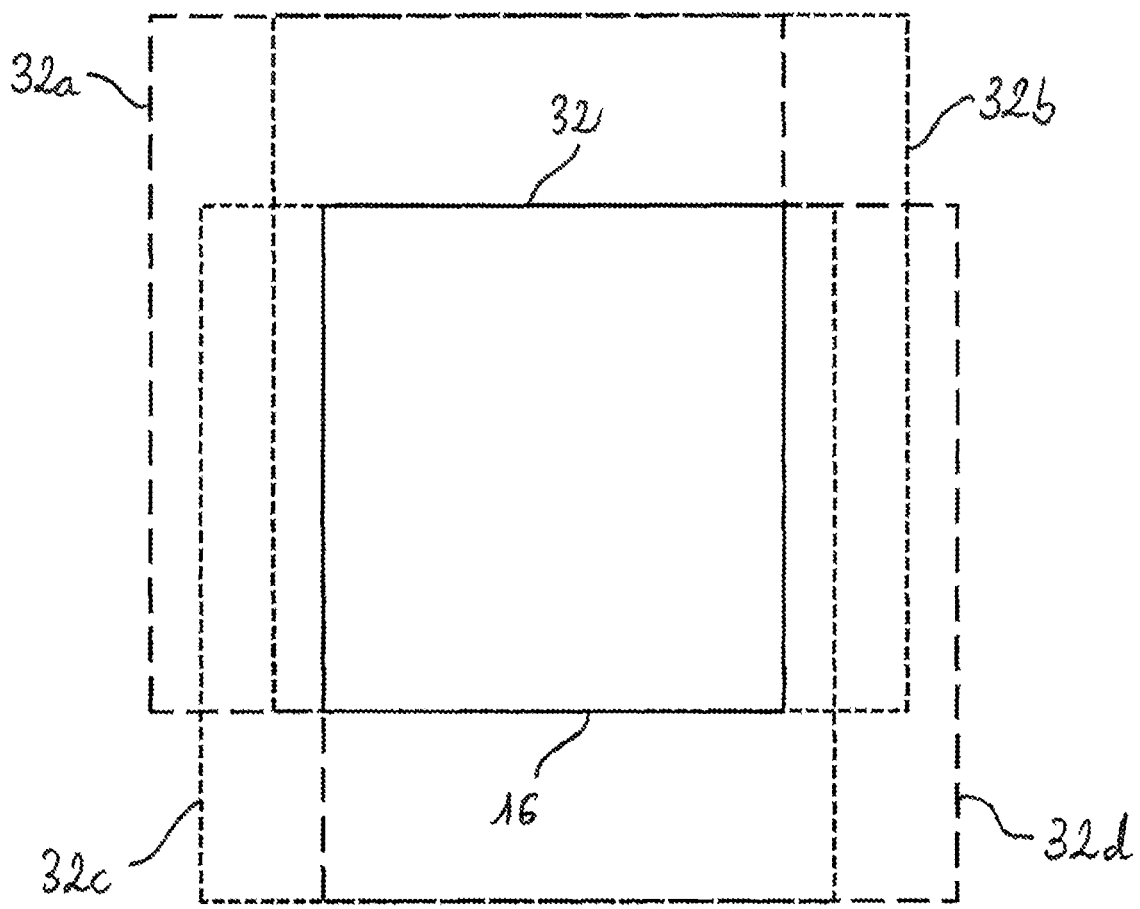
FIG. 4 shows a schematic representation of the working areas of four laser devices of a system in accordance with one embodiment of the invention.

FIG. 4 shows a schematic representation of the working areas of four laser devices 30 of a system in accordance with one embodiment of the invention. Each of the laser devices 30 of the system of the embodiment shown in FIG. 1 or 2 is configured for laser processing a corresponding square working area. The first to fourth laser devices 30 are each configured for laser processing a first to fourth working area 32a-32d. Each of the working areas 32a-32d in the embodiment shown covers an area of 608 mm×608 mm. The centre points of adjacent working areas are offset by 202.63 mm in the embodiment shown.

The four working areas 32a-32d have a common overlap area 32, which in the embodiment shown is congruent with the construction area 16. In other words, the square overlap area 32 forms the square construction area 16. The construction area 16 in the embodiment shown covers an area of about 402 mm×402 mm. The four laser devices 30 are configured for simultaneously parallel laser processing the construction area 16. The marking devices 20 in the embodiment shown may be configured for projecting their respective light reference marks 22 onto an outer periphery of the construction area 16. The four marking devices 20 of the embodiments shown in FIGS. 1 and 2 can be configured, for example, to project one of the light reference marks 22 onto one of the corners of the square construction area 16.

Figure 5:
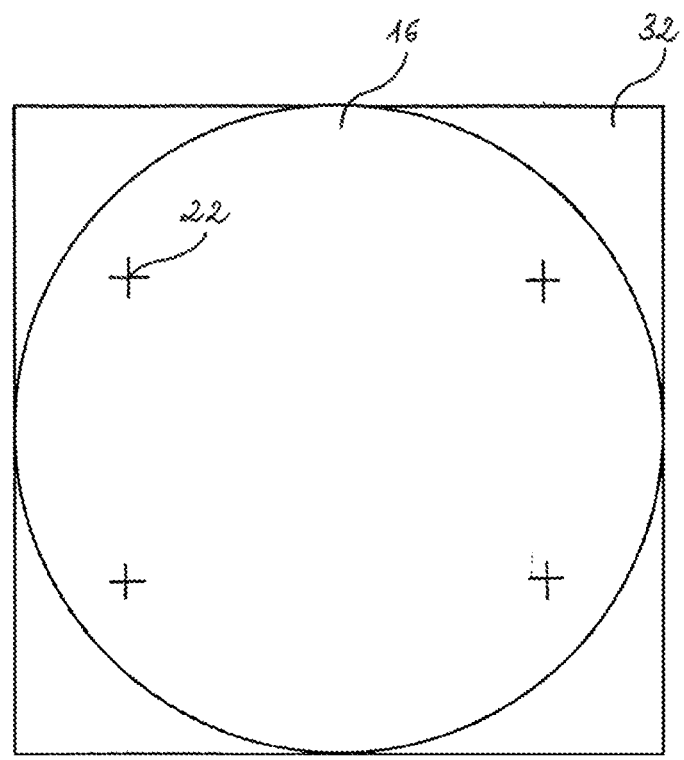
FIG. 5 illustrates an example spatial distribution of cross-shaped light reference marks or the reference marks on the construction area in accordance with one embodiment of the invention.

FIG. 5 shows a sample distribution of the light reference marks 22 on a circular construction area 16 in accordance with another embodiment of the invention. In the embodiment shown a square overlap area 32 of four laser devices 30 can be seen, which encompasses the circular construction area 16, but is not completely congruent with it.

Figure 6:
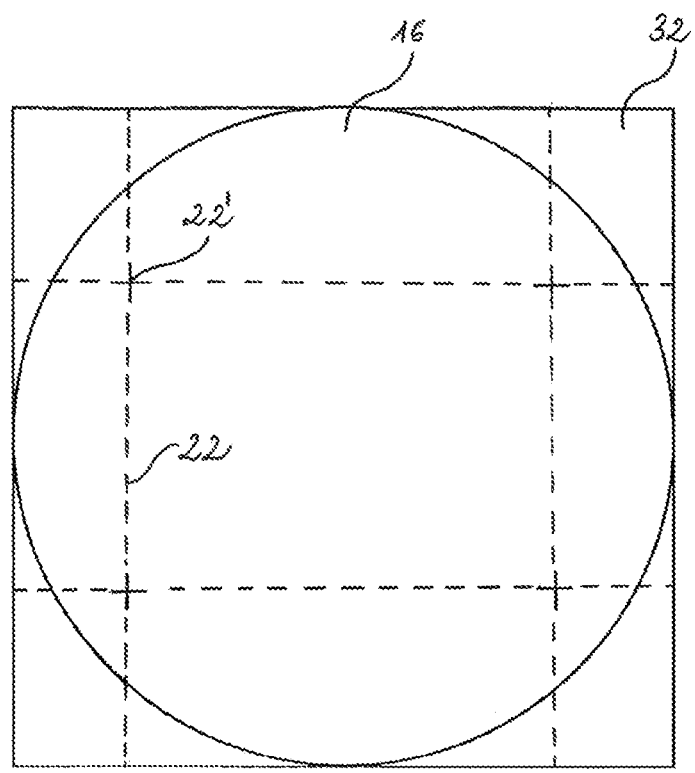
FIG. 6 illustrates an example spatial distribution of line-shaped light reference marks in accordance with one embodiment of the invention.

FIG. 6 shows an alternative embodiment, in which instead of four cross-shaped light reference marks as in FIG. 5, four laser lines 22 are projected, which intersect pairwise at four intersection points 22'. The laser lines 22 can each be generated by a line laser light source. The four laser lines 22 projected by the marking devices are oriented pairwise perpendicular and parallel to each other and form, as illustrated, a laser marker quadrilateral, whose vertices correspond to the intersection points 22'. The intersection points 22' can be used for calibrating and/or synchronizing. The detection of the intersection points 22' of the laser lines 22 is a special case of the above-mentioned detection of the light reference marks. It should be understood that the laser lines 22 need not be detected over their entire length, but only in the area of the intersection points 22'.

It is obvious to the person skilled in the art that the embodiments of FIGS. 5 and 6 can be combined, so that, for example, three or four intersection points, at which three or four corresponding laser lines cross, and also one or more additional individual, for example, point-shaped or shaped, light reference marks can be used as the basis for the calibration and/or the synchronization. Any combinations of point-shaped or cross-shaped and intersection points are possible, as long as at least three of the former or at least three of the latter are present.

Figure 7:
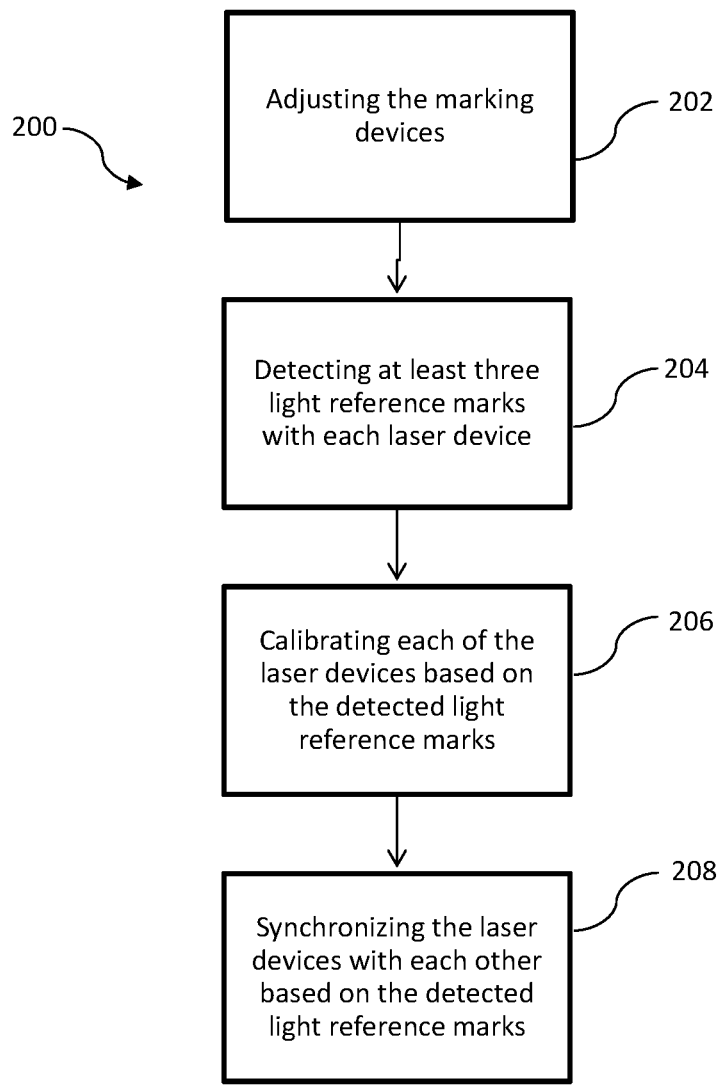
FIG. 7 shows a flow diagram of a method for calibrating and synchronizing the plurality of laser devices of a system in accordance with one embodiment of the invention.

FIG. 7 shows a flow diagram illustrating a method 200 for calibrating and synchronizing the laser devices of a system in accordance with one embodiment of the invention. The method 200 can be applied to a system according to any embodiment of the invention. An example of the method is described herein in relation to the embodiments shown in FIGS. 1 and 2.

The method 200 comprises a step 202, in which the marking devices 20 are adjusted such that each associated light reference mark 22 is brought into overlap with one of the reference marks 17/52.

The method 200 comprises a step 204, in which each of the laser devices 30 detects at least three of the light reference marks 22 projected by the marking devices 20.

The method 200 further comprises a step 206, in which the individual laser devices 30 are calibrated based on the detected light reference marks 22. The calibration comprises, in particular, the correction of an offset and the compensation of a gain drift, to which a deflection unit (which is not shown in the figures) of the respective laser device 30 may be subject. In the embodiment shown, the calibration is carried out using a selection from among the light reference marks 22. In this selection, the light reference marks 22 that are further from a central point of the working area of the associated laser device are preferred.

This can be better understood from FIG. 4. A first laser device 30, which is configured for performing the laser processing of the working area 32a, can be calibrated, for example based on the three light reference marks 22 that are located further away from the centre of the working area 32a than the closest light reference mark to this central point. If each of the four marking devices 20 of the embodiments shown in FIGS. 1 and 2 projects, for example, one of the light reference marks 22 onto one of the corners of the square construction area 16, the aforementioned closest light reference mark is located on the upper left corner of the square construction area 16. The first laser device can then be calibrated in the method step 206 based on the other three light reference marks 22, namely the light reference marks at the top right, bottom left and bottom right.

The method 200 further comprises a step 208, in which the four laser devices 30 of the system are synchronized with each other based on the detected light reference marks. This step 208 can be omitted for systems which in accordance with some of the embodiments of the invention described above comprise only one laser device 30.

The method steps 206 to 208 can be executed in any order, which need not correspond to the sequence shown in FIG. 7. In addition, the method 200 can comprise a repetition of all the steps of the method at regular intervals.

LIST OF REFERENCE NUMERALS 10 system
12 housing
14 construction volume
16 construction area
18 cover element
19 transparent part of the cover element
20 marking devices
22 light reference marks
22' intersection points of the light reference marks
30 laser device
32 overlap area of the working areas
32a-32d working areas
33 laser light source
34 detection device
35 first scanning mirror
36 second scanning mirror
37 lens
38 wavelength-selective optical element
39 camera
40 control unit
50 reference marking plate
52 reference marks
100 workpiece
102 movable support element
200 method
202-208 method steps

The invention claimed is:

1. A system for powder-bed-based additive manufacturing a workpiece, the system comprising:
  a housing comprising a construction volume, wherein the construction volume comprises a construction area;
  at least three marking devices fixed within or on the housing configured for projecting at least three light reference marks onto a workpiece arranged on the construction area and/or onto the construction area, wherein each marking device of the at least three marking devices is configured for projecting one of the at least three light reference marks onto the workpiece arranged on the construction area and/or onto the construction area;
  a plurality of laser devices for laser processing a powder bed for generating the workpiece on the construction area by means of additive manufacturing, wherein each of the laser devices is configured for laser processing an associated working area, wherein the working areas cover a common overlap area which corresponds to the construction area or comprises the construction area, wherein the plurality of laser devices are configured for simultaneously parallel laser processing the construction area, wherein each of the laser devices comprises a detection device configured for detecting the at least three light reference marks; and a control unit configured for calibrating the plurality of laser devices based on the at least three light reference marks detected by the detection device.

2. The system of claim 1, wherein at least three of the marking devices are each suitable for projecting a respective line-shaped light reference mark, wherein the line-shaped light reference marks intersect pairwise at least three corresponding intersection points;
wherein each of the detection devices are configured for detecting the at least three intersection points; and
wherein the control unit is further configured for calibrating each of the laser devices based on the at least three intersection points detected by the respective detection device.

3. The system of claim 1, further comprising a cover element suitable for covering the housing, wherein the at least three marking devices are preferably fixed in or onto the cover element.

4. The system of claim 1, wherein the at least three marking devices are arranged outside of the housing.

5. The system of claim 1, wherein the plurality of laser devices comprises at least four laser devices, each of which is suitable for processing the entire construction area in parallel for manufacturing the workpiece.

6. The system of claim 1, wherein the system further comprises a removable reference mark plate that can be arranged in or on the construction area, wherein the removable reference mark plate comprises the one or more reference marks.

7. The system of claim 1, wherein at least one of the marking devices comprises a laser light source and/or, wherein at least one of the marking devices is configured for generating laser light for generating the light reference mark, said laser light having one or more wavelengths between 405 nm and 850 nm.

8. The system of claim 1, wherein one or more of the marking devices are configured for projecting the corresponding light reference mark onto an outer perimeter of the construction area, or at a distance from the outer perimeter which does not exceed 10% of the dimension of the construction area.

9. The system of claim 1, wherein each of the laser devices comprises:
a laser light source configured for generating laser light for laser processing a workpiece;
a deflection unit configured for deflecting and scanning light; and a wavelength-selective optical element arranged between the deflection unit and the laser light source, wherein the wavelength-selective optical element is at least partially reflecting for one or more wavelengths of the laser light and at least partially transparent for one or more wavelengths of the at least three light reference marks, or vice versa;
wherein the wavelength-selective optical element is further configured for decoupling the light of the at least three light reference marks and direct it at the detection device.

10. The system of claim 1, wherein the laser device is structurally independent from the at least three marking devices.

11. The system of claim 1, wherein the at least three light reference marks are cross-shaped or point-shaped.

12. The system of claim 1, wherein the at least three marking devices are configured for projecting the at least three light reference marks in a first wavelength range, and wherein the laser device is configured for laser processing a powder bed using laser light in a second wavelength range different from the first wavelength range.

13. A system for powder-bed-based additive manufacturing a workpiece, the system comprising:
a housing comprising a construction volume, wherein the construction volume comprises a construction area;
at least three marking devices fixed within or on the housing configured for simultaneously projecting at least three reference marks onto a workpiece arranged on the construction area and/or onto the construction area, wherein each marking device of the at least three marking devices is configured for projecting one of said at least three light reference marks onto the workpiece arranged on the construction area and/or onto the construction area, wherein the at least three marking devices are configured for projecting the at least three reference marks at respective different locations onto the workpiece and/or onto the construction area;
a laser device for laser processing a powder bed for generating the workpiece on the construction area by means of additive manufacturing, wherein the laser device is configured for laser processing an associated working area, wherein the laser device comprises a detection device configured for detecting the at least three light reference marks; and
a control unit configured for calibrating the laser device based on the at least three light reference marks detected by the detection device.

14. The system of claim 13, wherein the at least three light reference marks are cross-shaped or point-shaped.

15. The system of claim 13, wherein the laser device is structurally independent from the at least three marking devices.

16. A system for powder-bed-based additive manufacturing a workpiece, the system comprising:
a housing comprising a construction volume, wherein the construction volume comprises a construction area;
at least three marking devices fixed within or on the housing configured for projecting at least three reference marks onto a workpiece arranged on the construction area and/or onto the construction area, wherein each marking device of the at least three marking devices is configured for projecting one of said at least three light reference marks onto the workpiece arranged on the construction area and/or onto the construction area, wherein the at least three marking devices are arranged outside a vertical projection of the laser device;
a laser device for laser processing a powder bed for generating the workpiece on the construction area by means of additive manufacturing, wherein the laser device is configured for laser processing an associated working area, wherein the laser device comprises a detection device configured for detecting the at least three light reference marks; and
a control unit configured for calibrating the laser device based on the at least three light reference marks detected by the detection device.

17. The system of claim 16, wherein at least three of the marking devices are each suitable for projecting a respective line-shaped light reference mark, wherein the line-shaped light reference marks intersect pairwise at at least three corresponding intersection points at respective different locations on the workpiece and/or on the construction area;
- wherein the detection device is configured for detecting the at least three intersection points; and
- wherein the control unit is further configured for calibrating the laser device based on the at least three intersection points detected by the detection device.

18. The system of claim 17, wherein the laser device is structurally independent from the at least three marking devices.

19. A method for calibrating and/or synchronizing a laser device or a plurality of laser devices of a system for powder bed-based additive manufacturing, the system comprising:
- a housing comprising a construction volume, wherein the construction volume comprises a construction area;
- at least three marking devices fixed within or on the housing, wherein each marking device is suitable for projecting a light reference mark onto a workpiece arranged on the construction area and/or onto the construction area;
- a plurality of laser devices for laser processing a powder bed for generating a workpiece on the construction area by means of additive manufacturing, wherein each of the laser devices is configured for laser processing an associated working area, wherein each of the laser devices comprises a detection device configured for detecting the light reference marks; and
- a control unit configured for calibrating each of the laser devices based on the light reference marks detected by the detection device;

the method comprising:

projecting at least three light reference marks onto a workpiece arranged on the construction area and/or onto the construction area, wherein each of the at least three light reference marks is projected by a respective one of the at least three marking devices;

detecting the at least three light reference marks with each of the laser devices; and calibrating each of the plurality of laser devices based on the detected light reference marks.

\* \* \* \* \*